United States Patent
Barry et al.

[15] 3,704,428
[45] Nov. 28, 1972

[54] CARBON MONOXIDE LASER FROM HELIUM-AIR-METHANE MIXTURE

[72] Inventors: James D. Barry; William E. Boney, III, both of Fairborn, Ohio

[73] Assignee: The United States of America as represented by the Secretary of the Air Force

[22] Filed: Oct. 4, 1971

[21] Appl. No.: 186,334

[52] U.S. Cl....................................331/94.5, 330/4.3
[51] Int. Cl..................................................H01s 3/22
[58] Field of Search.......................331/94.5; 330/4.3

[56] References Cited

UNITED STATES PATENTS 3,575,669   4/1971   Haeff..........................331/94.5
3,605,038   9/1971   Byrne et al. ................331/94.5

OTHER PUBLICATIONS

Deutsch, Applied Physics Letters, Vol. 8, No. 12, 15 June 1966, pp 334–335. QC 1 A 47
Bokhan, P. A., Optics & Spectroscopy, Vol. 26, No. 5, 1969, pp 773–779 C 350 064
Giuliano et al., NASA-CR-85005, 152 Page Report on Photochemical Laser Systems, an. 31, 1967 (N67-31658)

Primary Examiner—Ronald L. Wibert
Assistant Examiner—R. J. Webster
Attorney—Harry A. Herbert, Jr. et al.

[57] ABSTRACT

A gas laser charged with a mixture of helium-air-methane, operable in both the Q-switched and CW mode, forms vibrationally excited CO molecules by the electric discharge induced chemical oxidation of methane. The resulting laser output provides at least 80 laser emission lines in the region from 4.7848 to 5.8532 microns, with 20 lines below 5 microns. Multiline pulse powers greater than two kilowatts may be obtained from the molecules formed by the electrochemical reaction. The lines result from $P(J)_{v,v}$ vibration-rotational transitions in the formed CO with J ranging from 10 to 15 nominally and $v,v'$ ranging from 2:1 to 16:15. Simultaneous lasing of both the formed CO and $CO_2$ molecules may be obtained by using two different temperatures of cooling (approximately −200°C for one portion of the tube and approximately −80°C for the remainder) of the laser tube to provide additional emission lines in the 9 to 13 micron range.

8 Claims, 3 Drawing Figures

PATENTED NOV 28 1972 3,704,428

INVENTORS
JAMES D. BARRY
WILLIAM E. BONEY III

BY Harry A. Herbert Jr.
Robert Kern Duncan

ATTORNEYS

CARBON MONOXIDE LASER FROM HELIUM-AIR-METHANE MIXTURE

BACKGROUND OF THE INVENTION

The field of this invention is in the gas laser art.

Gas lasers (sometimes referred to as optical masers) utilizing the lasing properties of carbon monoxide are well known. U.S. Pat. No. 3,411,105 issued to patentee Chundra K. N. Patel is an example of a gaseous infrared laser. U.S. Pat. No. 3,429,599 issued to patentee William W. Rigrod is an example of a gas laser in which methane gas is used at relatively high pressure, in a separate cell, to emphasize the 6,328 angstrom line in a mode-locked pulse type of laser operation.

For additional background in regard to this invention reference is made to the following publications by the inventors: "Laser Emission from He-air-$CH_4$ and He-air-$C_3H_8$ Mixtures" appearing in Vol. 18, No. 1 APPLIED PHYSICS LETTERS FOR Jan. 1, 1971 at page 15; "4.9-$\mu$ He-Air-$CH_4$ — (CO) Laser" appearing in IEEE JOURNAL OF QUANTUM ELECTRONICS, Vol. QE-7, No. 5, May 1971 at page 208; and, "CO($v$ = 2:1) Laser Transitions From He-Air-$CH_4$" appearing in IEEE JOURNAL OF QUANTUM ELECTRONICS, Vol. QE-7, No. 9, Sept. 1971, at page 461.

SUMMARY OF THE INVENTION

A gas laser is provided that is operable in both the Q-switched and CW mode. It will provide multiline pulse powers greater than 2 kilowatts. A unique mixture of charging gas comprising Helium, air, and a gas of the methane series ($C_nH_{2n+2}$) combines through electrochemical action and electron collisional excitation, in the direct current field in the laser tube, to generate the lasing molecules. Many new lines of emission, heretofore unavailable, are provided below 5 microns in wavelength. The utility of laser beams in communicating, measuring, and spectrometry is well known and the desirability of extending the spectrum of laser emission is well recognized.

This invention discloses a unique system for generating CO laser emission and CO plus $CO_2$ emission and provides useful emissions at wavelengths much lower than heretofore obtainable. The components of physical hardware used in fabricating the structural embodiments of the invention are generally well known in the laser art.

DESCRIPTION OF THE PREFERRED EMBODIMENTS

Figure 1:
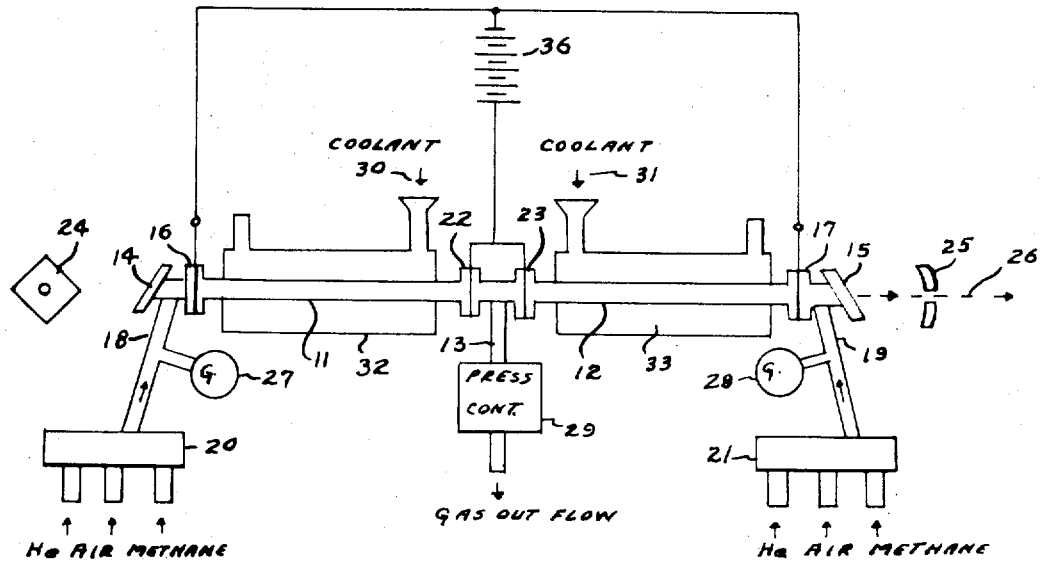
FIG. 1 is a schematic drawing of an embodiment of the invention having two lasing chambers and Q-switched.

The schematic diagram shown in FIG. 1 is representative of a plurality of embodiments of the invention in which two discharge tubes are used. A specific one of these embodiments will be described first, with the results obtainable.

Two double-walled Pyrex discharge tubes, 11 and 12, are connected in series by a central pumping port 13, and terminated with conventional Brewster windows 14 and 15. $CaF_2$ and NaCl are examples of generally suitable material for the Brewster windows. In the embodiments lasing both CO and $CO_2$, the NaCl windows are preferred due to their lower loss characteristics. The excitation electrodes are in the conventional Varian flanges 16 and 17. The gas mixture is introduced at each end of the laser tube assembly by tubes 18 and 19. While two mixing headers 20 and 21 and two sets of sources for the component gases, are shown in the schematic diagram, it is to be understood that a single gas source of helium-air-methane and a single mixing header with a connecting tube going to the other end of the assembly may be used. (That is, tubes 18 and 19 are connected together and go to a common header.) The preferred pumping rate, i.e., the rate of flow of the gas through tube 13 out of the laser, is approximately 35 liters per minute. The lengths of the laser tubes 11 and 13 do not need to be the same. In the particular embodiment being detailed, one tube is 76 cm and the other is 84 cm in length as measured between flanges 16 and 22, and flanges 23 and 17 respectively. A total electrical active region in the glass section of the tubes is 149 cm. The total length between flanges 16 and 17, including the center pump port is 168 cm. Both tubes have approximately a 3.8 cm inside diameter. The optical cavity, approximately 210 cm in length, is formed between the aluminum-coated flat mirror surface of the conventional Q-switch mirror 24 and a gold-coated, 10-meter-radius, concave mirror with a 2 mm centered circular hole 25. A direct current (DC) power supply 36 provides the excitation. A nominal 9.5 kilowatts at 25 milliampere has been found to provide a suitable electrical field for this particular embodiment of the laser. It is not critical, nor is the polarity of the field critical. In determining the following tables listing the operating parameters, the output beam 26 of the laser was measured by deflecting part of the beam, by a conventional beam splitter, to a Perkin-Elmer Model E-14 spectrometer with an internal 144 line/mm grating and a slit width of less than 50 microns for line determination. The emission passing through the beam splitter was chopped and detected by a Raytheon Model QKN 1568 Au:Ge liquid-nitrogen-cooled detector coupled to a conventional oscilloscope. The Q-switched power was measured with an Eppley Thermopile Model 10397 coupled to a Kiethley Microvolt-Ampmeter Model 150A. Conventional variable leak valves were used in the headers 20 and 21 to control the gas ratios through partial pressure measurement by conventional gaging 27 and 28. The optimum He-Air-$CH_4$ mixture was found to be approximately 168-4-1, respectively. The total tube pressure was maintained at about 4 torr by the gas outflow control 29. A 50 percent change in the relative pressures provides only minor degradation in operation provided about the same respective pressure ratios are maintained as noted in Table III. Changes of the order of 10 percent in the relative pressure of the $CH_4$ will cause minor reductions in the power output and begin to reduce the number of laser emission lines below 5.0 microns.

The Q-switch 24 is a conventional rotating cubic mirror having one surface coated so as to be effectively 100 percent reflective. The Q-switch is positioned and aligned so that this reflective surface forms one of the optical cavity mirrors. Normal preferred rotational speeds are approximately 10 Hz, which give half-height pulse widths of approximately 1 microsecond. (The data of following Table 1 was taken at this rate.) Higher rates, greater than about 100Hz, reduced the pulse widths to about 100 nanoseconds and increased the laser power, but reduced the number of emission lines and eliminated the very low vibrational transition, i.e., below 4.9 microns. The later mentioned different constituents in the laser plasma were identified by using a conventional (Magnetic Sector) Mass Spectrometer.

The embodiment of the invention shown schematically in FIG. 1 may be operated as primarily a CO laser, He-Air-$CH_4$ — (CO), or it may be operated as a hybrid laser, i.e., with both CO and $CO_2$ lasing simultaneously, represented as He-Air-$CH_4$ — (CO)($CO_2$). For CO lasing both plasma tubes 11 and 12 are cooled to approximately $-200°C$. This may conventionally be done by encasing the plasma tubes in a liquid nitrogen bath. Thus, in this type operation liquid nitrogen is used for the coolants 30 and 31 and the casings 32 and 33 surrounding the lasing tube are maintained approximately filled with liquid nitrogen. The temperature of liquid nitrogen effectively freezes out the $CO_2$ and the $H_2O$.

$CO_2$ lasing does not occur when the He-air-$CH_4$ laser is operated at room temperatures (30°C) due to the copious quantity of water vapor generated in the plasma tube, as this large amount of water vapor is deleterious to $CO_2$ laser emission. By cooling one tube to approximately $-200°C$ with liquid nitrogen, resulting in CO emission, and the other tube to approximately $-80°C$ with a Freon dry-ice bath, in which most of the $H_2O$ is frozen out but not the $CO_2$, $CO_2$ emission occurs. The combination then results in a laser lasing simultaneously from both CO and $CO_2$ derived from a common gaseous mixture originally containing neither CO nor $CO_2$.

Figure 2:
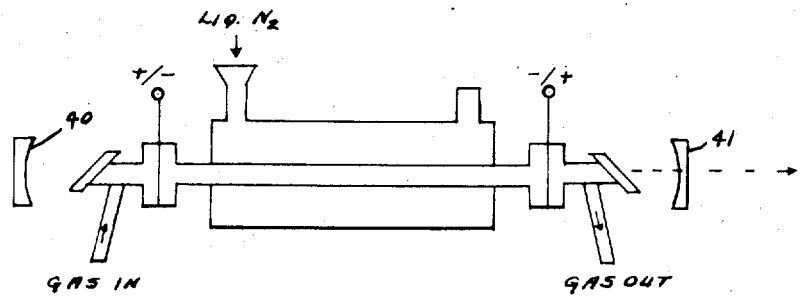
FIG. 2 is a schematic drawing of an embodiment of the invention having a single lasing chamber and operated in the CW mode.
Figure 3:
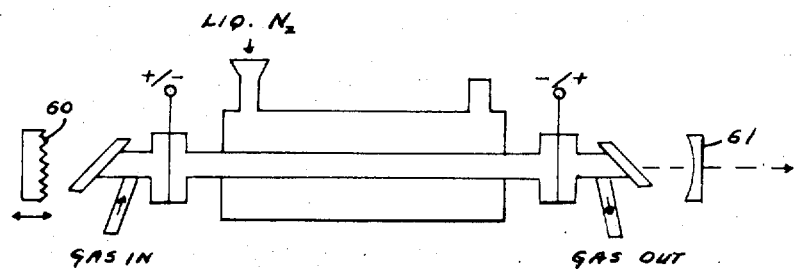
FIG. 3 is a schematic drawing of an embodiment of the invention to provide CW single-line operation.

The embodiment of the invention shown in FIG. 1 may be operated Q-switched by the use of the rotating mirror Q-switch 24, or it may be operated CW by substituting for the rotating mirror a fixed mirror such as shown schematically at 40 in the embodiment shown in FIG. 2, or it may be operated in the single line mode by substituting a movable diffraction grating, such as shown in FIG. 3, for the rotating mirror. The results obtainable from these three modes of operation are tabulated later in Table II. First a brief description of each mode will be given.

CONTINUOUS WAVE (CW) OPERATION

The He-air-$CH_4$ continuous wave laser as disclosed herein is much superior in providing carbon monoxide laser emissions below 5.0 microns to previously known He-air-CO or He-air-$CS_2$ continuous wave lasers. The new $P(J)_{v,v}$ laser lines measured in air occur at 4.8836, 4.8935, 4.8974, 4.9072, 4.9366, 4.9466, 4.9620, and 4.9778 microns. The identifications are $P(11)_{3,2}$, $P(12)_{3,2}$, $P(6)_{4,3}$, $P(7)_{4,3}$, $P(10)_{4,3}$, $P(11)_{4,3}$, $P(13)_{4,3}$, and $P(14)_{4,3}$, respectively. Such $v,v' = 3:2$ transitions have been previously observed occasionally in Q-switched, pulsed, and supersonic flow lasers but they have been only infrequently observed, and they have been of unstable nature particularly in previous CW lasers. The multiline multimode power below 5.0 microns, in the specific embodiment set forth, is generally less than 50 milliwatts. With the hole-coupled mirror 25, normal total CW multimode-multiline power is 2 watts. A 10 percent transmission mirror, as shown schematically at 41 in FIG. 2, substituted for the hole-coupled mirror increases the total power to approximately 4 watts. As previously stated, the preferred pressure ratio of He-air-$CH_4$ mixture is nominally 168:4:1 with a total tube pressure of 4 to 5 torr.

Propane, $C_3H_8$, of the methane series as represented by $C_nH_{2n+2}$, may be used instead of $CH_4$ in the laser of this invention, using the same cavity configuration as used with $CH_4$. The optimum relative gas pressure ratio of He-air-$C_3H_8$ is approximately 1045:10:1 respectively, with a total tube pressure of about 4.5 torr. Generally, $C_3H_8$ is not as desirable a constituent of the gas mixture as $CH_4$ for providing below 5 micron laser emission. With He-air-$C_3H_8$ emission lines measured in air occur from 4.9467 to 5.5717 microns. The multiline power level is approximately 20 milliwatts; considerably less than with $CH_4$. The power level with the He-air-$C_3H_8$ gas mixture is relatively insensitive to changes in the gas mixture ratio, except that low $C_3H_8$ partial pressures lase more readily. The emission lines are predominantly from CO, normally $P(9)$ to $P(14)$, with $v,v'$ ranging from 5–4 to 12–11. Generally, only one line below 5 microns is readily produced with the $C_3H_8$ mixture and that is the $P(4)_{4,3}$ line from CO. As stated, $CH_4$ is generally preferred over $C_3H_8$. This is also true of the more complex hydrocarbon molecules. As the number ($n$) in the series $C_nH_{2n+2}$ is increased the total laser power and laser lines below 5 microns generally decrease. The greatest number of carbon atoms ($n$) in the chain for useable operation appears to be 18.

Q-SWITCHED OPERATION

Generally Q-switched operation of the disclosed laser provides more CO emission lines than with CW operation, and more importantly, much lower wavelengths are generated than with heretofore known CO lasers. Embodiments of this invention in the Q-switched mode generate 8 CO laser emission lines in air from 4.7848 to 5.8532 microns. Twenty of these lines are below 5 microns. Those lines below 5 microns with the wavelengths measured in air, the associated wave numbers and the identifications are listed in the following Table I. (Additional CO emissions from the Q-switched embodiment will be given later in Table II comparing the emissions.)

TABLE I

| Wavelength (Micron) | Wavenumber (CM$^{-1}$) | $P(J)_{v,v'}$ |
|---|---|---|
| 4.7848 | 2089.952 | $P(7)_{2,1}$ |
| 4.7940 | 2085.941 | $P(8)_{2,1}$ |
| 4.8036 | 2081.772 | $P(9)_{2,1}$ |
| 4.8132 | 2077.620 | $P(10)_{2,1}$ |
| 4.8228 | 2073.484 | $P(11)_{2,1}$ |
| 4.8324 | 2069.365 | $P(12)_{2,1}$ |
| 4.8424 | 2065.092 | $P(13)_{2,1}$ |
| 4.8526 | 2060.751 | $P(14)_{2,1}$ |
| 4.8624 | 2056.598 | $P(15)_{2,1}$ |
| 4.8744 | 2051.535 | $P(10)_{3,2}$ |

| | | |
|---|---|---|
| 4.8840 | 2047.502 | $P(11)_{3,2}$ |
| 4.8942 | 2043.318 | $P(12)_{3,2}$ |
| 4.9044 | 2039.069 | $P(13)_{3,2}$ |
| 4.9141 | 2034.961 | $P(14)_{3,2}$ |
| 4.9245 | 2030.663 | $P(15)_{3,2}$ |
| 4.9370 | 2025.522 | $P(10)_{4,3}$ |
| 4.9470 | 2021.427 | $P(11)_{4,3}$ |
| 4.9672 | 2013.207 | $P(13)_{4,3}$ |
| 4.9776 | 2009.000 | $P(14)_{4,3}$ |
| 4.9880 | 2004.812 | $P(15)_{4,3}$ |

Q-switched power greater than 2 kilowatts per multiline pulse are obtained with single-line powers being approximately 100 watts per pulse in the region from 4.9 to 5.3 microns. The nominal power per pulse of the 20 lines below 5.0 microns is of the order of ten watts per pulse. The Q-switched lines enumerated herein are obtained from free-running, hole-coupled laser operation without forced oscillation on the preferred gain line. It has been determined that the Q-switched laser emissions are the result of vibrational-rotational transitions within the ground electronic energy state of CO. The transitions were identified by using the appropriate vibrational-rotational constants for CO and the conventional vacuum to air wavelength conversion equations. The laser emission lines result from $P(J)_{v,v}$, transitions within CO, occurring for $v,v' = 2:1$ to $v,v' = 16:15$, with $J = 10$ to 15, primarily.

SINGLE-LINE OPERATION

The laser herein disclosed will operate CW, single-line, by exchanging the flat Q-switch mirror assembly 24 of FIG. 1 for a movable diffraction grating as shown at 60 of FIG. 3. A Littrow replica grating by Bausch and Lomb with 100 lines per mm and blazed at 15° for 5.18 microns is an example of a suitable grating. As shown in the later following Table II, a lesser number of transitions are present in this operation than in CW or Q-switching. It is not known at this time whether this is due primarily to the quality of the cavity, to the grating, or to the vibrational level population processes, which may be laser-operation-dependent. The power of the single-line emission may be conventionally measured using the previously mentioned Au:Ge detector with a 500 Hz chopping rate and an Eppley Thermopile. The single-line powers from this embodiment are as great as 30 milliwatts; the 4.9907 line, $P(9)_{5,4}$, is generally of the order of 3 to 5 milliwatts. The single-line operation is quite dependent upon the relative gas ratios. For instance, a change of the order of a 10 percent increase in the $CH_4$ pressure, will cause the lasing to change from the $v,v' = 6,5$ transitions to the $v,v' = 5,4$ transitions.

A summary of the operating characteristics of the specific embodiments previously described and as represented generally by the schematic diagram of FIG. 1 is given in the following Table II which shows a comparison of the He-air-$CH_4$ — (CO) laser emissions measured under multiline Q-switch, multiline CW, and single line CW operations.

TABLE II

| Vibrational Band | Q-switched multiline | P(J) Transitions Observed CW, multiline | CW, single line |
|---|---|---|---|
| 2:1 | 7,8,9,10,11, 12,13,14,15 | | |
| 3:2 | 9,10,11,12, 13,14,15 | 11,12,13,14,15 | |
| 4:3 | 10,11,13,14, 15 | 6,7,8,9,11,13, 14,15,16 | |
| 5:4 | 9,10,11,12 13,14,15 | 5,7,9,10,11,12, 13,14,15,16,17 | 9,10,11,12 |
| 6:5 | 4,10,11,12, 13,14 | 4,5,6,7,8,9,10, 11,12,13,14,15 | 9,10,11,12,13, 14 |
| 7:6 | 9,10,11,12, 13,14 | 8,9,11,12,13, 14 | 10,11,12,13,14 |
| 8:7 | 8,9,10,12,14 | 9,12,14 | 10,12,14 |
| 9:8 | 8,9,10,11, 12,13 | 11,12,13,14 | 11,12,13,14 |
| 10:9 | 8,9,10,11, 12,13 | 9,10,12,13 | 10,11,12,13 |
| 11:10 | 8,9,10,11, 12,13 | 9,11,13 | |
| 12:11 | 8,9,10,11,13 | 9,10,11 | |
| 13:12 | 8,9,10,12 | | |
| 14:13 | 8,10,11 | | |
| 15:14 | 7,10 | | |
| 16:15 | 8,9,13 | | |

To provide simultaneous lasing of CO and $CO_2$ an embodiment of the invention as shown schematically in FIG. 1, with one section of the discharge tube cooled to approximately the temperature of liquid nitrogen and the other section of the discharge tube cooled to approximately the temperature of dry ice, as previously stated, is used. For CO lasing primarily, both sections of the tube are cooled to the temperature of liquid nitrogen. Single discharge tube cavities, cooled by liquid nitrogen may be used as shown in FIG. 2 and FIG. 3 when CO lasing only is desired. Discharge tube lengths, tube diameters, electric field potential and powers, gas pressures, and gas mixtures are not critical but they obviously are somewhat interdependent as is well known in the art. For example, satisfactory laser operation for the generation of emission lines below 5 microns has been achieved with lasers having the parameters as shown in Table III. The use of rotating Q-switches, as shown at 24 in FIG. 1; hole-coupled mirrors, as shown at 25 in FIG. 1; essentially totally reflective mirrors, as shown at 40 in FIG. 2; partially reflective mirrors, as shown at 41 in FIG. 2 and at 61 in FIG. 3; and frequency selective movable gratings, as shown at 60 in FIG. 3, are well known in the art and applicable to all embodiments of the invention. The laser tube may also be constructed with mirrors positioned directly on the ends of the tube, normally called "internal mirrors," thereby eliminating the need for Brewster windows and externally positioned mirrors. Obviously the internal mirrors must be properly aligned as before, to correctly form the optical cavity.

TABLE III

| | Embodiments of He—air—$CH_4$ | | | | | | He—$O_2$—$CH_4$ |
|---|---|---|---|---|---|---|---|
| | No. 1 | No. 2 | No. 3 | No. 4 | No. 5 | No. 6 | Reference |
| Gas ratio | 168:4:1 | 176:21:1 | 176:21:1 | 400:30:1 | 168:4:1 | 61:6:1 | 70:9:1 |
| Gas flow, l./min | 35 | 35 | 35 | 25 | 35 | 35 | 35 |
| Total tube length, cm | 197 | 125 | 100 | 168 | 125 | 125 | 125 |
| Discharge length, cm | 168 | 77 | 80 | 148 | 77 | 77 | 77 |
| Tube diameter, cm | 2.5 | 3.8 | 3.8 | 2.5 | 2.5 | 2.5 | 2.5 |
| Tube configuration | (¹) | Single | Single | Single | Single | Single | Single |
| Approximate press., torr | 4.0 | 5.0 | 3.4 | 4.0 | 5.0 | 4.0 | 4.0 |
| Approximate temp., °C | −200 | −200 | −200 | −200 | −200 | −200 | −200 |
| Discharge current, m amp | 30 | 25 | 20 | 20 | 20 | 20 | 45 |
| Optical cavity length, cm | 227 | 160 | 171 | 200 | 160 | 160 | 160 |
| Emission lines, below 5 microns | 18 | 12 | 12 | 6 | 20 | 4 | None |
| Total emission lines | 78 | 30 | 30 | 40 | 40 | 20 | 30 |

¹ Two tubed center pumped.

THE ELECTROCHEMICAL REACTIONS

Electrical discharges in gaseous molecular lasers usually cause the composition of the gas mixture to change, resulting in new chemical species. Chemical reactions induced by the electron discharge often produce fragments in a vibrationally excited state. These fragments or chemical products are often involved in the laser processes. The electrical discharge, as well as the molecular interactions with the tube wall, have a strong influence upon the lasing process.

The CO apparently is formed within the laser discharge tube by electrochemical reactions summarized as:

$$2CH_4 + 3O_2 \xrightarrow{DC\ discharge} 2CO + 4H_2O$$

The mechanism arriving at this is believed to behave as follows:

$$CH_4 + O_2 \rightarrow \dot{C}H_3 + H\dot{O}_2;$$
$$\dot{C}H_3 + O_2 \rightarrow H_2CO + \dot{O}H;$$
$$\dot{O}H + CH_4 \rightarrow \dot{C}H_3 + H_2O;$$
$$\dot{O}H + H_2CO \rightarrow H_2O + H\dot{C}O;$$
$$H_2CO + O_2 \rightarrow H\dot{C}O + H\dot{O}_2;$$
$$H\dot{C}O + O_2 \rightarrow CO + H\dot{O}_2;$$

and $CO_2$ is also formed by $$\dot{O}H + CO \rightarrow CO_2 + \dot{H}$$
$$H_2CO + \dot{H} + O_2 \rightarrow H_2O + CO_2 + \dot{H}.$$

Visual examination of the discharge tube indicates the presence of $H_2O$ and some $CO_2$. Apparently, the CO laser emissions are limited at the longer wavelengths due to $H_2O$ absorption. No $CO_2$ lasing has been detected in embodiments cooled throughout the discharge region to the temperature of liquid nitrogen.

A yellowish colored deposit, fibrous and crystalline in character, accumulates on the tube wall. The deposit increases in quantity with laser operation. By mass spectrometric and IR spectral analysis this deposit was found to be principally $NH_4NO_3$; no CH bands were detected. $NH_4NO_3$ apparently is formed by the following mechanism taking place;

$$\tfrac{1}{2}N_2 + O_2 \xrightarrow{DC\ Discharge} NO_2$$

$$2NO_2 + 2H_2O \rightarrow 2HNO_3 + H_2$$
$$N_2 + 3H_2 \rightarrow 2NH_3$$
$$NH_3 + HNO_3 \rightarrow NH_4NO_3$$

The presence of $NH_4NO_3$ does not appear to be a hazard during continual operation since it is diluted with $H_2O$. However, if the laser is restarted and operated at a higher pressure a hazard may exist particularly if the $NH_4NO_3$ is dry.

Using $O_2$ rather than air in the embodiments of this invention decreases the laser power and eliminated the transitions below $v, v' = 6:5$. This is shown for reference in the last entry in Table III. In order to achieve lasing at the lower vibrational levels, especially at the $v, v' = 2:1$ transitions, $N_2$ must be present in the gas mixture, thus lasing at the lower wavelengths is dependent upon the presence of the $N_2$. The $N_2$ is related to CO vibrational excitation by:

$$N_2(v) + CO(v') \rightarrow N_2(v-1) + CO(v'+1)$$

where the $N_2$ vibrational excitation is believed to proceed by electron collisional excitation. The excitation cross section is electron-energy-dependent but apparently greater for CO at the electron energies normally maintained in the laser discharge. Previous studies indicate that CO excitation to $v \leq 8$ proceeds mainly by the electron collision processes. Since previously known CO lasers have operated without nitrogen present, the use of $N_2$ appears to be unnecessary for this operation at longer wavelengths. The main CO vibrational excitation process in these previous lasers is apparently that of CO—CO vibrational relaxation due to the CO anharmonicity. The requirement of $N_2$ for the low vibrational level laser emission lines, of this invention, to appear, suggests that the CO vibrational excitation process is not dominated by CO—CO relaxation processes, however it apparently is influenced by them, but it is believed that the $N_2$—CO relaxations dominate.

At this time it is not certain if the CO electrochemically formed within the laser of this invention is produced in some vibrationally excited state. Using an equal pressure of CO in place of the $CH_4$ resulted in about a 30 percent decrease in multimode multiline power. This, plus the large amount of polymolecular deposit produced by $CH_4$ reactions, shows that the CO lasing excitation processes at low pressures as herein disclosed are more effective in that new emission lines are produced and the operation is different from those of previously known CO lasers.

We claim:

1. A gas laser comprising:
    a. means forming an enclosed space.
    b. a gaseous mixture comprising helium, air, and a gas of the methane series as represented by $C_nH_{2n+2}$ where $n$ is a positive integer;
    c. means for introducing said gaseous mixture within said enclosed space;
    d. means for supplying a direct current excitation field to said gaseous mixture to electrochemically form at least one active laser medium from said gaseous mixture;
    e. means for cooling at least a portion of said enclosed space; and
    f. optical resonant cavity means positioned about said enclosed space for resonating and for coupling coherent radiation from said laser medium.

2. The laser as claimed in claim 1 wherein the said gas of the methane series is $CH_4$.

3. The laser as claimed in claim 1 wherein the said gas of the methane series is $C_3H_8$.

4. A gas laser simultaneously lasing carbon monoxide and carbon dioxide comprising;
    a. means forming an enclosed space;
    b. a gaseous mixture comprising $He$-air-$CH_4$;
    c. means for introducing said gaseous mixture into said enclosed space;
    d. means for forming in said enclosed space, at least two separate portions;
    e. means for cooling a first portion of said enclosed space to approximately $-200°C$;
    f. means for cooling a second portion of said enclosed space to approximately $-80°C$;
    g. means for supplying a direct current excitation field to said gaseous mixture to electrochemically form CO gas for lasing in said first portion and $CO_2$ gas for lasing in said second portion; and
    h. optical resonant cavity means positioned about said enclosed space for resonating and coupling coherent radiation from said gas laser media.

5. The laser as claimed in claim 4 wherein the pressure in said enclosed space is approximately 4 torr.

6. The laser as claimed in claim 5 further comprising means for exhausting said gaseous mixture from said enclosed space; and means for flowing said gaseous mixture through said enclosed space.

7. A gas laser for lasing carbon monoxide at a plurality of wavelengths below 5 microns comprising:
   a. a gas laser tube having a gas inlet and a gas outlet and terminated at each end with Brewster angled windows;
   b. a gaseous mixture of He-air-$CH_4$;
   c. means for introducing said gaseous mixture into said inlet at an approximate pressure of 4 torr;
   d. means for flowing said gas mixture through said enclosed space at a flow rate of approximately 35 liters per minute;
   e. means for generating a direct current electric discharge in said laser tube to electrochemically form a CO gas laser medium;
   f. means for cooling said laser tube to approximately $-200°C$; and
   g. optical resonant cavity means positioned about said enclosed space for resonating and for coupling coherent radiation from said laser medium.

8. The gas laser as claimed in claim 7 wherein the said gaseous mixture of He-air-$CH_4$ is in the ratio of approximately 168:4:1 respectively.

* * * * *